May 5, 1953
L. S. EMMERT
2,637,265
CONSTRUCTION UNIT
Filed March 12, 1948
4 Sheets-Sheet 1
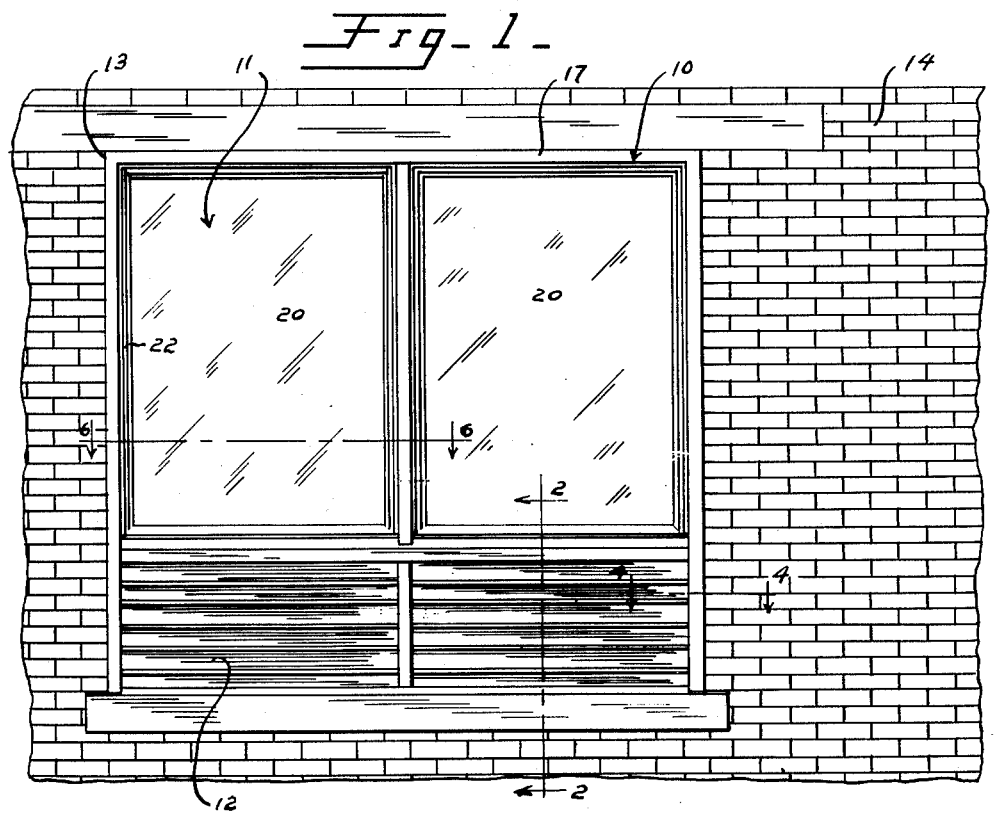
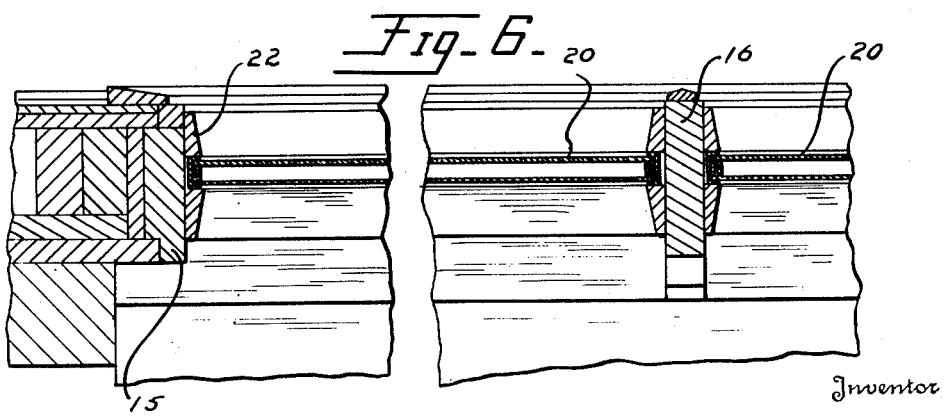
Inventor
LORENZO S. EMMERT
By Jerome W. Paxton
Agent.

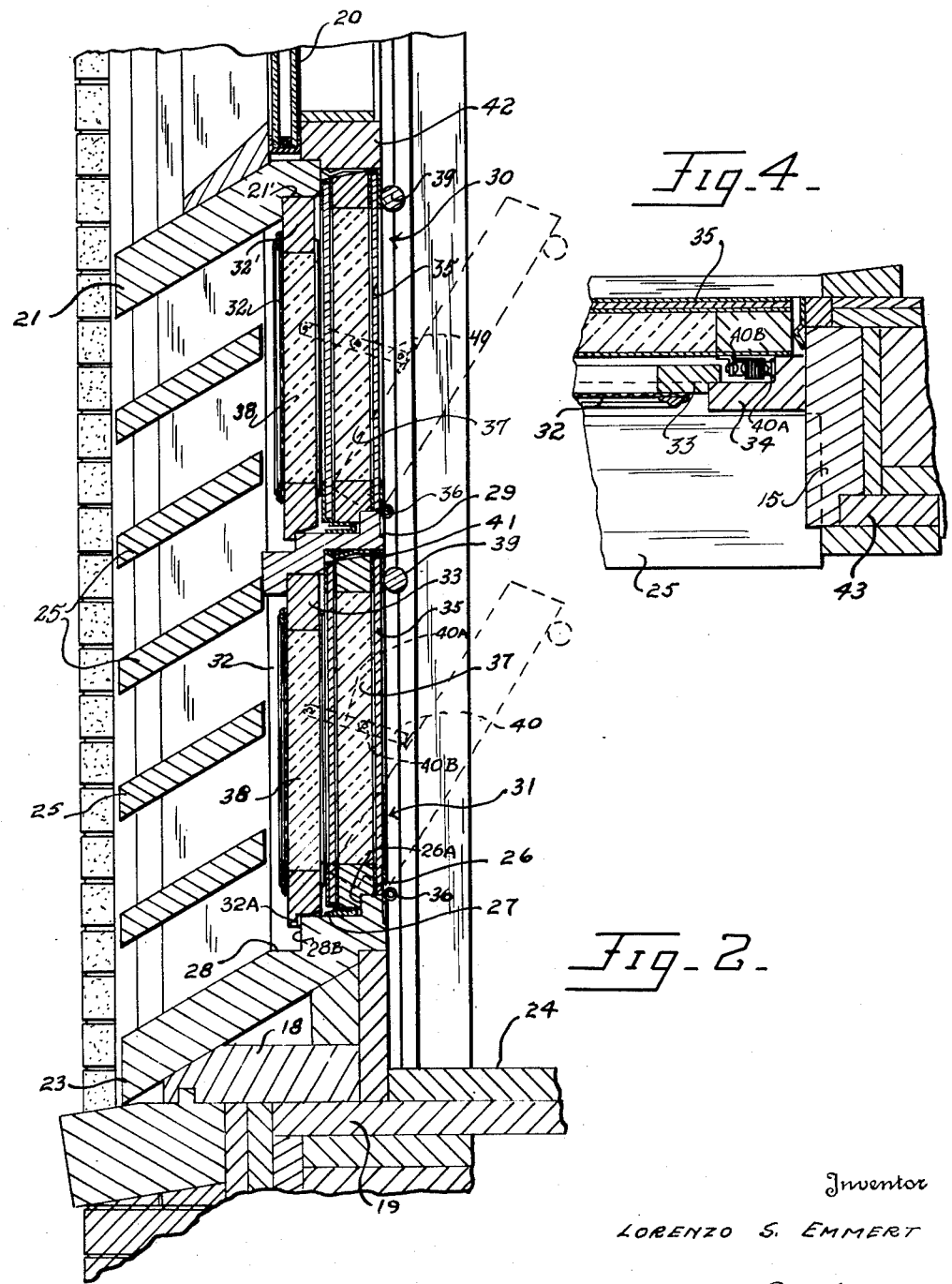

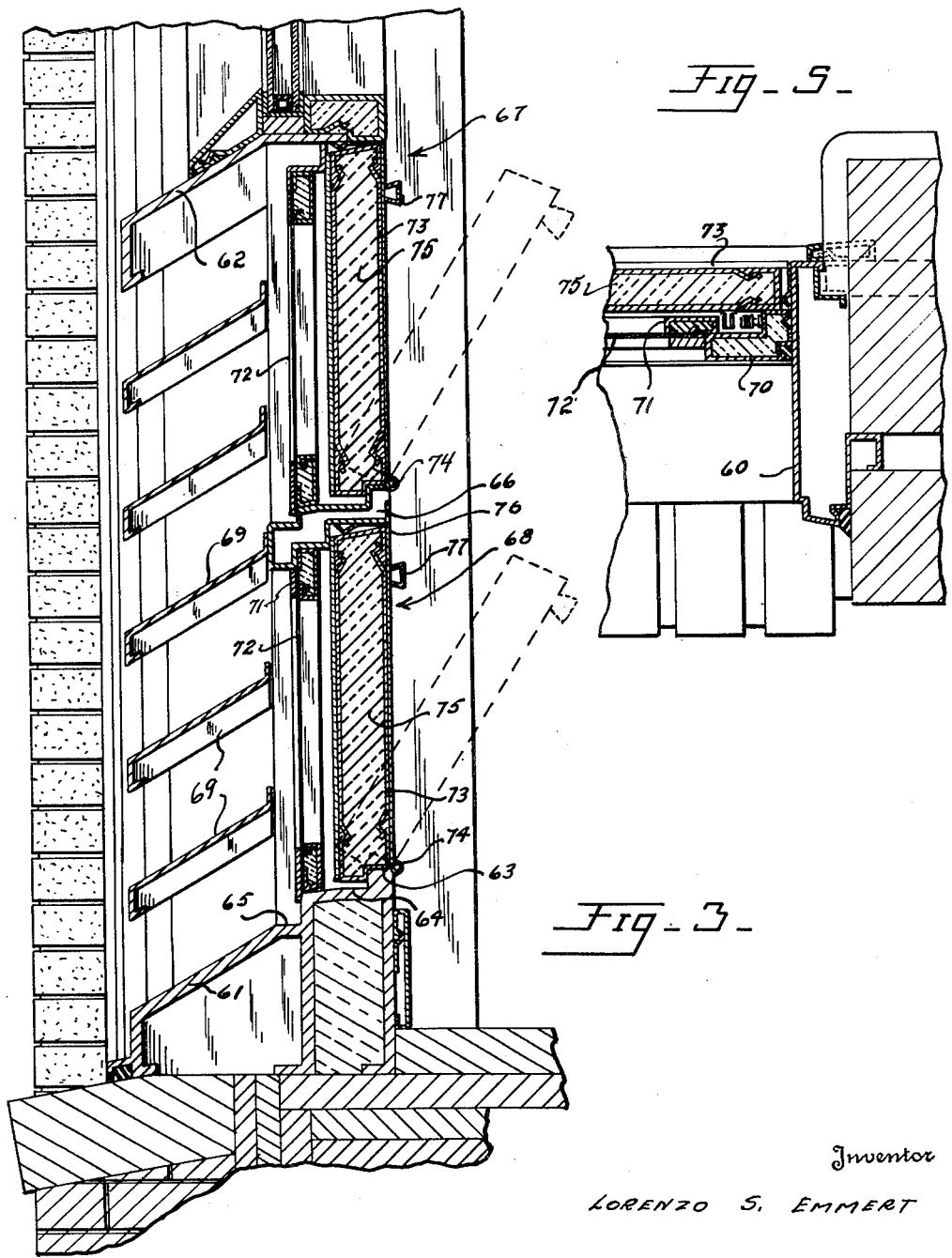

May 5, 1953  L. S. EMMERT  2,637,265
CONSTRUCTION UNIT
Filed March 12, 1948  4 Sheets-Sheet 4
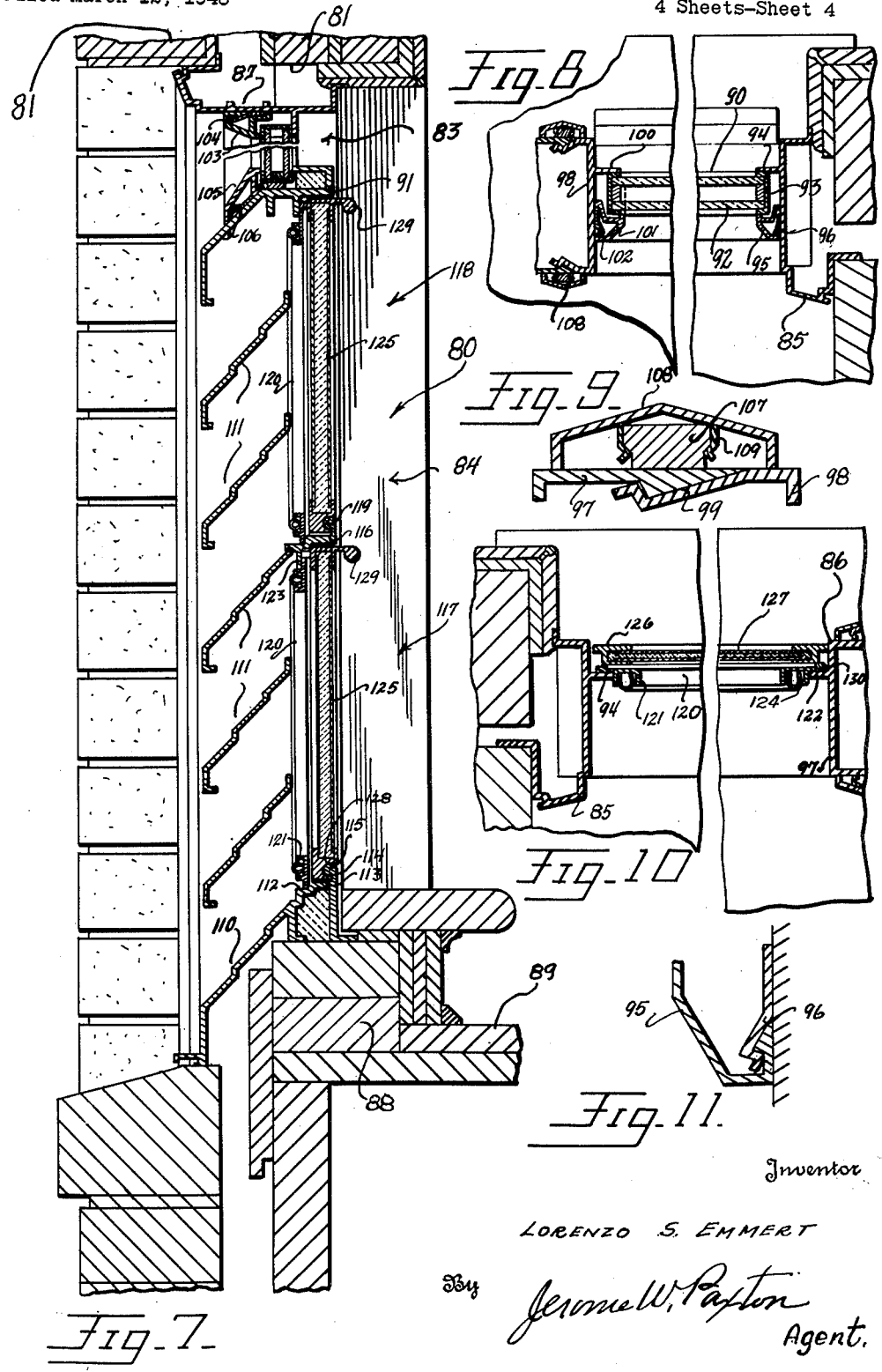
Inventor
LORENZO S. EMMERT
By Jerome W. Paxton
Agent.

Patented May 5, 1953

2,637,265

UNITED STATES PATENT OFFICE 2,637,265

CONSTRUCTION UNIT

Lorenzo Stanley Emmert, Elkhart, Ind.

Application March 12, 1948, Serial No. 14,583

4 Claims. (Cl. 98—88)

The present invention relates to a construction unit adapted to be received in an opening formed in a building wall, and more particularly has reference to a construction unit which is so designed as to include a solar heating area and an air-flow area.

More specifically, the invention comprises a framework adapted to be inserted in an opening in a wall construction provided with a solar heating area wherein the transparent medium is fixed in the framework and the air-flow area is so constructed that the air entering the building therethrough may be regulated within very fine limits, and is so designed that the elements, such as a driving rain, cannot enter the room, even though the air-flow be in its fully opened position. In the preferred embodiment of my invention, I have found that under most circumstances, it is desirable to have the air-flow area disposed below the solar heating area, although if architectural requirements are such, the air-flow area may be placed above, on either or both sides of the solar heating area. In any event, the solar heating area and the air-flow area are incorporated in a single structural unit.

I am cognizant of the fact that it has heretofore been proposed in the building field to incorporate within a unit frame, a window section and a ventilating section. In actual practice, however, these prior constructional units have been so designed that rain can enter the building through the ventilating area, particularly when the area is in the position for admitting air into the building. This is due largely to the lower sill construction of the ventilating area and the mode of attachment of the door which is provided for closing the area in the event ventilation is not desired. Moreover, even if the door is in its closed position, such as during adverse weather conditions, the construction is such that water may collect at the lower end of the ventilating area and gain entrance into the building by passing under the door and thence into the room. Manifestly, this is undesirable, since the water will damage the interior of the room. In addition, the framework whereby the unit in its entirety may be secured in the building has not been designed to properly secure the constructional unit unless the mechanic or workman installing the assembly is highly skilled.

An important object of the present invention is to provide a structural unit having incorporated therein a solar heating section and an air-flow section which are so constructed and arranged as to overcome the above-mentioned and other disadvantageous features now present in the art.

Another object of this invention is to provide a unitary solar assembly for insertion in a single opening in a building wall having incorporated therewith a louvered air-flow area having baffles on the room side of the area for regulating the quantity of air entering the room wherein the sill construction of the air-flow area is such as to positively prevent water entering the interior of the room through the air-flow area.

Another object of my invention is to provide a louvered air-flow area wherein the lower sill is so designed as to accommodate a removable screen structure on the room side of the area and a hinged baffle in parallel relation thereto, wherein the screen is disposed above and away from the sill, thereby enabling any water entering through the screen to flow below the screen and thence downwardly to the outside of the building.

Another object of my invention is to provide a constructional unit having a solar heating area and an air-flow area which may be installed into all types of wall constructions by unskilled persons without the employment of special tools or equipment.

Yet another object of the present invention is to provide a constructional unit of the type described, wherein the unit includes a subcasing member, thereby providing means for properly securing the unit to all types of wall constructions.

Still another object of the present invention is to provide a constructional unit having a solar heating section and air-flow section which permits the use of narrow mullions and trim, thereby affording a more attractive interior and exterior appearance.

Another object of the present invention is to provide a constructional unit embodying a solar heating area and an air-flow area that is of a modular design, thereby permitting a quick and easy multiple unit installation in building openings.

Yet another object of my invention is to provide a constructional unit having a solar heating area and an air-flow area wherein the mullion jambs are formed of a pair of cooperating members which may be readily attached or detached.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a front elevational view of the structural unit made in accordance with my inventive concept and installed in a building wall of brick construction.

Figure 2 is a sectional view taken along the line 2—2 of Figure 1, looking in the direction of the arrows, but being on an enlarged scale.

Figure 3 is a vertical sectional view generally similar to Figure 2, showing a metal constructional unit.

Figure 4 is a sectional view taken along the line 4—4 of Figure 1, looking in the direction of the arrows.

Figure 5 is a sectional view generally similar to Figure 4 of the construction shown in Figure 3.

Figure 6 is a view taken along the line 6—6 of Figure 1, looking in the direction of the arrows.

Figure 7 is a vertical sectional view of another form of my constructional unit of modular design, wherein the solar heating area is partly broken away.

Figure 8 is a horizontal sectional view, partly broken away, taken through the solar heating area, showing the manner in which the transparent member is attached to one of the side jambs and to the mullion jamb.

Figure 9 is a horizontal sectional view of the mullion jamb illustrating the mode by which a trim member is secured to the jamb and also the connection between the two members constituting the mullion jamb.

Figure 10 is a horizontal sectional view, partly broken away, through the air-flow area.

Figure 11 is a detail vertical sectional view showing the detachable connection between one of the side jambs and the outside stop for the transparent panel.

Referring to the drawings, and more particularly to Figure 1, I have designated my novel constructional unit generally by the numeral 10 and this unit includes an upper solar heating section 11 and a lower air-flow section 12. The frame 10 is adapted to be installed in an opening 13 provided in a wall 14 of any material such as brick, stone, or wood.

The frame 10 includes side jambs 15, a mullion jamb 16, and the upper ends of these jambs are suitably secured to a horizontally disposed bar or head jamb 17. The lower ends of the jambs 15 and 16 are secured to a sub-sill 18 attached to sub-flooring 19, such as is customary in most building constructions.

A transparent window 20 is adapted to seal the open area between the side jambs and the mullion jamb and the head jamb 17 and an upper sill 21 which extends between the side jambs 15 at the upper end of the air-flow area 12. As shown in Figure 6, the transparent window 20 is secured to the above described framework by a trim or the like 22. In most warm climates, it is only necessary to employ single plate glass for the pane 20, although it is to be understood that in colder climates, double or triple plate glass may be utilized. While in Figure 1 I have shown the use of two panes or panels of glass 20, it is to be understood that if the building specifications require, a more or less number may be used.

The air-flow area 12 is provided with a bottom sill 23 which extends between the side jambs 15. The sill 23, and attention is called to Figure 2, is disposed at an angle with respect to the floor, designated 24, of the room, and is maintained in this position by the sub-sill 18. A plurality of spaced louver boards 25 extend transversely across the side jambs and may be secured at their ends in the jambs by rabbeting or the like. The outer ends of the louver boards are approximately flush with the outer edges of the upper and lower sills 21 and 23, respectively.

The upper extremity of the lower sill 23 is cut away to provide a ledge or shelf 26, a second horizontal shelf 27 and a third shelf 28, the respective shelves falling in different planes with a vertical wall 26A connecting the outer end of the shelf 26 with the inner end of the shelf 27, and a second vertical wall 28A extending between the outer end of the shelf 27 and the inner end of the shelf 28. Intermediate the sills 21 and 23 I provide a horizontally extending support 29 which, in effect, divides the air-flow area into an upper section 30 and a lower section 31. The support 29 is provided with similar ledges or shelves at the upper end thereof and a screen 32 mounted in a supporting frame 33 is removably carried by the support 29 and vertical members 34 secured to the side jambs. The lower horizontal frame member of the screen 32 is rabbeted along the rear edge thereof as at 32A for cooperating with the ledge 27 and the wall 28A, the rabbeted portion being slightly spaced away from the shelf and vertical wall to permit water to flow beneath the screen, as previously pointed out. Spaced rearwardly of the screen 32 and in parallel relation thereto is a baffle 35 which is hinged at its lower end, as shown at 36, to the shelf 26. The lower edge of the baffle 35 is rabbeted as at 35A to conform to the contour of the ledge 26 and wall 26A of the sill 23. To provide for additional protection in cold weather, a block of insulating material 37 may be inserted in the framework of the baffle 35, and a similar strip of material 38 may be disposed within the framework of the screen 32.

As best shown in Figure 2, the baffle 35 is provided with a pull or handle 39 to facilitate the opening and closing of the baffle. To enable the baffle to be held in any given position from its full closed position to the full opened position shown by the broken lines, a friction catch 40 is associated therewith and this arrangement is particularly efficacious in that the air-flow can be controlled within very fine limits. The friction catch includes a link 40A secured to the vertical member 34 (Figure 4) and one end of a second link 40B is pivoted to the free end of the link 40A, the opposite end of the link 40B being pivoted to the baffle at any convenient point. The links are so constructed that the baffle may be supported at any desired angle from the closed position shown in full lines in Figure 2 to the full open position depicted by the broken lines. The baffle may be maintained in its closed position by means of a bullet catch (not shown) which cooperates with a recess provided in the horizontal support 29.

It will be readily appreciated that there can be a considerable heat loss through the air-flow area, and to offset this possibility, it will be observed that I provide weather-stripping, designated generally 41, which seals all of the edges of the baffle 35.

In the event of a driving rain and assuming the baffle 35 to be in its closed position, the rain will either run down the screen to the inclined sill 23 or pass through the screen, thereby contacting the outer face of the baffle and being diverted downwardly to the horizontal portion or step 27 under the lower frame of the screen 32 and thence downwardly along the sill to the exterior of the building. In the event the baffle is in its open position, the rain will likewise contact the baffle and flow downwardly in the same manner as previously described. In any event, it cannot enter the room by virtue of the vertical wall 26A between the horizontal faces or ledges 26 and 27, and by virtue of this construction of the upper end of the sill, there is no location where water can collect for seepage into the interior of the room. The advantage of this construction is thought obvious and persons are free to leave their home with the air-flow in an open position and feel assured that the interior decoration of the room adjacent the air-flow area cannot be damaged due to inclement weather conditions.

Another important feature of this particular construction, and in this connection, attention is called to Figure 4, is that the vertical member 34 secured to the side jamb 15 in combination with the frame of the screen 32 also function as a baffle to prevent the rain from entering the inside of the building at the ends of the baffle 35.

The upper air-flow area which I have designated 30 is similar in structural detail and operation to the screen and baffle discussed in conjunction with the lower area, with the exception that the upper horizontal portion of the frame 32' which frame is similar in structural detail to the frame 33 of the lower air-flow area cooperates with a rabbeted portion 21' formed in the upper sill 21. Also, the upper portion of the baffle coacts with a horizontally extending stool or support 42 which extends between the side jambs 15. The stepped horizontal support 29 cooperates with one of the louvers 25 which is adjacent thereto for draining off the water in the manner above described in conjunction with the lower sill 23. As a consequence, it is not thought necessary to elaborate any further on the operation of the upper air-flow area 30.

In order to facilitate the proper securing of the frame 10 in the opening in the building wall, I provide a sub-casing designated 43 (Figure 4) associated therewith. This means that the unit may be readily installed without requiring the services of highly skilled technicians and, in addition, the sub-casing will reduce the possibility of heat loss and infiltration.

The constructional unit may be equipped with trim both interior and exterior, as clearly apparent from the drawing, and moreover, by the use of the narrow mullion jamb or jambs, there is provided a more attractive appearance both internally and externally. In view of the fact that I employ a relatively narrow mullion jamb, there will be minimum loss of heat and minimum infiltration through the solar heating area and no additional storm sash in cold climates is necessary.

While I have shown in the drawings the use of an air-flow area employing two separate sets of screens and baffles, it is, of course, obvious that by varying the height of the upper and lower sills, the air-flow area may be regulated within close limits and, in some instances, it may be necessary to employ but a single screen and baffle, while in other instances, it may be necessary to employ a series of screens and baffles.

The structural unit also offers security against intruders, since the only area of a size sufficient to permit access into the building is the solar heating area 11 and to gain admittance therethrough, the transparent pane 20 would have to be removed from its framework which, of course, is a rather painstaking operation. Another and quite important feature of the present unit is the fact that small children may readily operate the baffle of the air-flow area free of any danger of falling from the window.

In Figures 3 and 5, I have illustrated the constructional unit being made of a suitable metal and this unit finds particular application for use in school buildings, hospitals and similar structures. The unit comprises side jambs 60 and the air-flow area is defined by a lower sill 61 and an upper sill 62 which extend between the area defined by the side jambs. The sills are preferably of hollow construction and are secured to their supporting surfaces in any convenient manner. The lower sill 61 is so formed as to extend at an angle with respect to the building wall, and the upper end thereof is formed with stepped horizontal ledges 63, 64 and 65. Intermediate the sills 61 and 62 is a horizontal hollow support 66 also of stepped configuration which provides an upper air-flow area 67 and a lower air-flow area 68. The front of the respective air-flow areas is provided with a plurality of metal louvers 69 which are fixed in parallel relation to the sills and suitably secured at their extremities to the side jambs 60. Also supported by the side jambs 60 are vertical supports 70 and it can be seen that a frame 71 provided with a screen or grid 72 is removably supported by the horizontal support 66, and the vertical supports 70. The lower horizontal edge of the frame is disposed above and slightly away from the step 64 of the lower sill 61 so that any water entering the area may flow under the screen to the outside of the building. This frame 71 is removable for cleaning, repair or replacement purposes.

Positioned rearwardly of and in parallel relation to the frame 71 is a baffle 73 which is hingedly connected to the sill 61, as shown at 74, so that the lower end of the frame rests upon the horizontal shelf 63. A block of suitable insulating material 75 is located within the baffle, and weather-stripping 76 is provided along the edges of the baffle to minimize heat loss. An operating knob 77 adjacent the upper edge of the baffle is employed to open and close the baffle, and the baffle may be held in various open positions by means of a friction catch or equivalent structure.

The screen and baffle disposed in the upper air-flow area 67 are similar in structural detail and operation to that of the lower air-flow area and no further description is believed necessary.

With reference to Figures 7 to 11, inclusive, there is shown a structural unit of modular design which affords a multiple unit installation adaptable to multiples of masonry units. This unit is identified generally 80 and is adapted to be installed in an opening 81 of a wall 82. The unit 80 comprises a solar heating area 83 and an air-flow area 84. While the air-flow area 84 is shown disposed below the solar heating area, it may be located above or on either or on both sides of the heating area, depending upon architectural requirements. The unit 80 comprises side jambs 85, a mullion jamb 86, and the upper ends thereof are conveniently attached to a head jamb 87. The lower ends of the jambs 85 and 86 are attached to the sill 88 on subflooring 89, and it will be noted that the side jambs 85, mullion jamb 86 and head jamb 87 are of extruded metal.

A transparent window 90 seals the open area between the side jambs and the mullion jamb along its vertical edges. The horizontal edges of the window extend from the head jamb 87 to an upper sill 91 of extruded metal which is in parallel relationship to the head jamb and bridges the area between the side jambs and the mullion jamb. The sill 91 also defines the upper limit of the air-flow area 84.

As shown in Figure 8, the transparent window comprises spaced glass panes 92 mounted in a suitable frame 93. The vertical edge of the frame adjacent the side jamb 85 is maintained in proper position between a room side stop 94 and an outside stop 95. The stop 95 is secured to the jamb 85 by means of a clip 96. The room side stop 94 is extruded as part of the jamb 85, and both the stop 95 and the clip 96 are also extruded metal.

As perhaps best shown in Figure 9, the mullion jamb 86 includes a female member 97 and a male member 98. The members 97 and 98 are detachably secured, as shown at 99, thereby providing for the quick and easy assembly or disassembly of the mullion jamb. An inside stop 100 for the vertical edge of the transparent window 90 is extruded as a part of the male member 98 and an outside stop 101 is secured to the mullion jamb by a clip 102. The stop 101 and clip 102 are similar in structural details to the stop and clip 95 and 96, respectively, provided on the side jamb 85. A stop 103 for the upper horizontal edge of the transparent window is secured to the head jamb 87 by an extruded metal clip 104, and a stop 105 for the lower end edge of the window is detachably connected to the top sill 91, as shown at 106. It can be seen, therefore, that the transparent window for the solar heating area 83 can be readily installed or removed and due to the simplicity of the structural joints it is not necessary to employ highly skilled workmen.

To improve both the room side and exterior faces of the mullion jamb, it will be observed that a plurality of screw-like members or lugs 107 are spaced vertically of the mullion jamb and a trim member 108 is provided with a snap fastener 109 which engages the screw-like member or lug 107 for detachably connecting the trim to the jamb.

While the drawing shows that the solar area 83 comprises a pair of parallel transparent panes or panels with an air space therebetween, it is, of course, obvious that single or triple plate glass may be employed, depending upon building specifications.

The air-flow area 84 includes a bottom sill 110 of extruded metal and extends between the jambs and is suitably secured to the sill 88. The sill 110 extends upwardly at an angle with respect to the floor 89, and a plurality of suitably spaced extruded metal louvers 111 are disposed transversely of the air-flow area and may be suitably affixed at their outer edges to the jambs. The upper end of the sill 110 is formed with spaced horizontal steps 112 and 113, respectively, and the sill terminates in a vertical flange 114 having a pivot 115 along the upper edge thereof. The purpose of the pivot 115 will later be more fully described. A rail 116 of extruded metal is located intermediate the lower sill 110 and the upper sill 91, thereby dividing the air-flow area into a lower section 117 and an upper section 118. The rail 116 is also formed with a pair of horizontal ledges and terminates in a pivot member 119 similar in details to the pivot 115. The ends of the rail may be secured to the jambs in any convenient manner.

A screen 120 having a frame 121 is adapted to be disposed rearwardly of the louvers 111 and, as shown in Figure 10, the frame engages the stop 94 on the jamb 85 along its vertical edge. The female member 97 of the mullion jamb 86 has a vertically disposed stop 122 for the opposite vertical edge of the frame, and this member is extruded as a part of the mulltion member 97. The rail 116 has formed therewith a vertical flange 123 which engages the upper horizontal edge of the frame 121, and the lower horizontal edge is disposed above and slightly away from the ledge 112 of the sill 110, thereby providing a path for the easy exit of any water entering the area. The frame 121 is of channel shape and the screen 120 may be secured therein by clips 124. A baffle 125 is positioned rearwardly of the screen 120 and includes a frame 126 of extruded metal having a core 127 of insulating material secured therein. The lower horizontal edge of the frame 126 is formed with a longitudinally extending socket 128 which receives the pivot head 115 on the lower sill 110 for pivotally mounting the baffle for room side movement. The upper horizontal edge of the frame 126 is formed with a pull member 129 and this member extends the entire length of the horizontal edge of the frame 126. A weather strip 130 is provided to seal both the screen 120 and the baffle 125 along its vertical edges, as clearly apparent in Figure 10.

The baffle may be held in any desired open position by means of a friction adjuster (not shown), associated with the baffle and located at each vertical edge of the baffle between the baffle and the side and mullion jamb. The provision of the adjuster will enable the air entering the air-flow area to be controlled to a fine degree.

Since the baffle closing the upper section 118 is similar in structural detail and function to the lower baffle 125, it is not thought necessary to describe in detail this assembly and the same reference characters will be applied thereto. Since the air-flow area functions in substantially the same manner as the forms previously described, it is believed that a person skilled in the art will readily appreciate that rain cannot enter the room through the air-flow area.

The advantages of this particular assembly are thought readily apparent and the novel manner in which the mullion jamb may be assembled or disassembled enables any design requirements to be immediately and easily complied with. This modular design is especially efficacious in structural units such as schools and similar buildings wherein it may be necessary to group a plurality of structural units together. The novel design of the mullion jamb enables my structural unit to be immediately installed in buildings of this type.

By virtue of the above description, it is thought apparent that the present invention provides a unitary construction unit for insertion in a single opening in a building wall which will afford proper air-flow and at the same time prevent rain from entering the interior of the building through the louvered air-flow area. The air-flow area is furthermore provided with weather stripping and insulating material which will reduce to a minimum, heat loss. The frame for the screen by being removably mounted within the air-flow area enables the structure to be readily removed for cleaning and other purposes, and in the event weather conditions warrant, the frame is so fabricated that a block of insulating material may be incorporated therewith for cooperating in conjunction with the baffle to effectively seal the air-flow area against the elements.

The unit is simple in structural detail and by virtue of the subcasing incorporated therewith enables an unskilled workman to locate properly the structural unit within the building opening.

The invention is not to be confined to any strict conformity with the showing in the drawings but may be changed or modified so long as such changes or modifications mark no material departure from the salient features of the invention as expressed in the appended claims.

I claim:

1. A constructional unit having a solar heating area and an air-flow area adapted to be secured within an opening in a building wall including a pair of side jambs, a head jamb connecting the upper ends of the side jambs, a sill connecting the lower ends of the side jambs, a second sill spaced above the lower sill and connected to the side jambs, a transparent panel closing the area defined by the head jamb, side jambs and second sill to constitute the solar heating area, a plurality of louvers extending transversely of the area defined by the lower sill, the second sill and the side jambs with the ends of the louvers secured to the side jambs, the said lower sill being provided with an upper face inclined downwardly in the direction of the exterior of the building wall and spaced from the lowermost louver to constitute a drain leading to the exterior of the building wall, the upper end of said lower sill terminating in at least two substantially horizontal ledges falling in different planes with one ledge being spaced below the other ledge, a substantially vertical wall connecting the ledges with the lowermost ledge being adjacent the downwardly inclined face of the sill, and a baffle pivotally connected to the uppermost ledge and being of an area sufficient to close the opening defined by said sills and side jambs, the said substantially vertical wall and baffle preventing rain from entering the inside of the building wall whereby the rain may flow down the uppermost ledge and along the downwardly inclined face of the lower sill to the exterior of the building wall.

2. A constructional unit as defined in and claimed by claim 1 further characterized in that said baffle is provided with a removable insulating block and that weather stripping seals the edges of the baffle.

3. A constructional unit as defined in and claimed by claim 1 further characterized in that a screen is removably supported by the side jambs between the baffle and the louvers.

4. An air-flow unit adapted to be secured within an opening in a building wall including a pair of side jambs, an upper sill connecting the upper ends of the side jambs, a lower sill connecting the lower ends of the side jambs, a plurality of louvers extending transversely of the area defined by the lower sill, the upper sill and the side jambs with the ends of the louvers secured to the side jambs, the said lower sill being provided with an upper face inclined downwardly in the direction of the exterior of the building wall and spaced from the lowermost louver to constitute a drain leading to the exterior of the building wall, the upper end of said lower sill terminating in at least two substantially horizontal ledges falling in different planes with one ledge being spaced below the other ledge, a substantially vertical wall connecting the ledges with the lowermost ledge being adjacent the downwardly inclined face of the lower sill, and a baffle pivotally connected to the uppermost ledge and being of an area sufficient to close the opening defined by said upper sill, lower sill and side jambs, the said substantially vertical wall and baffle preventing rain from entering the inside of the building wall whereby the rain may flow down the uppermost ledge and along the downwardly inclined face of the lower sill to the exterior of the building wall.

LORENZO STANLEY EMMERT.

References Cited in the file of this patent

UNITED STATES PATENTS

| Number | Name | Date |
| --- | --- | --- |
| 804,956 | Keighley | Nov. 21, 1905 |
| 1,093,415 | Himes | Apr. 14, 1914 |
| 1,157,827 | Wardwell | Oct. 26, 1915 |
| 1,380,980 | Lane | June 7, 1921 |
| 1,630,692 | Crosthwaite | May 31, 1927 |
| 1,813,629 | Lumley | July 7, 1931 |
| 1,840,667 | Gustafson | Jan. 12, 1932 |
| 1,995,456 | Kannel | Mar. 26, 1935 |
| 2,303,739 | Hasenburger et al. | Dec. 1, 1942 |
| 2,305,445 | Poor et al. | Dec. 15, 1942 |
| 2,320,268 | Cramer | May 25, 1943 |
| 2,403,565 | Triller | July 9, 1946 |
| 2,440,468 | Gerken | Apr. 27, 1948 |

FOREIGN PATENTS

| Number | Country | Date |
| --- | --- | --- |
| 9,383 | Great Britain | June 26, 1915 |
| 198,293 | Great Britain | May 31, 1923 |